United States Patent [19]

Billiu

[11] Patent Number: 5,173,142
[45] Date of Patent: Dec. 22, 1992

[54] METHOD OF MAKING REINFORCED STRUCTURAL COMPOSITE ASSEMBLIES

[75] Inventor: Charles R. Billiu, Mount Clemens, Mich.

[73] Assignee: Wellman Machinery of Michigan, Inc., Mich.

[21] Appl. No.: 732,618

[22] Filed: Jul. 19, 1991

[51] Int. Cl.$^5$ .............................................. B32B 31/28
[52] U.S. Cl. ................................. 156/245; 156/272.2; 156/273.3; 156/275.5; 156/292; 156/304.2
[58] Field of Search ............... 156/272.2, 273.3, 275.5, 156/292, 304.2, 306.9, 307.1, 245

[56] References Cited

U.S. PATENT DOCUMENTS 2,668,133  2/1954  Brophy et al. ............... 156/275.5
2,997,419  8/1961  Lawton ........................ 156/275.5

FOREIGN PATENT DOCUMENTS 0001217  1/1984  Japan ........................... 156/275.5

Primary Examiner—Caleb Weston
Attorney, Agent, or Firm—Reising, Ethington, Barnard, Perry & Milton

[57] ABSTRACT

The present invention contemplates a method of making a hollow section fiber reinforced composite assembly useful as a structural component wherein a first rigid, fiber reinforced, EB (electron beam) curable-thermoplastic composite member is formed by liquid castable molding (LCM) thermoplastic-forming material about a fiber reinforcement and a second rigid, fiber reinforced, EB curable-thermoplastic composite memer is similarly formed. The first and second rigid, fiber reinforced, thermoplastic members are then fusion bonded together in a manner to form a hollow section. The hollow sectio is subjected to irradiation by high energy electrons effective to cure the bonded first and second fiber reinforced, EB curable-thermoplastic members to a thermoset condition useful in structural applications.

15 Claims, 2 Drawing Sheets

METHOD OF MAKING REINFORCED STRUCTURAL COMPOSITE ASSEMBLIES

FIELD OF THE INVENTION

The present invention relates to manufacture of a reinforced structural composite assembly including spaced apart outer and inner members joined together and, more particularly, to molding outer and inner members from a reinforcement material impregnated with a liquid castable thermoplastic material, fusion bonding the molded thermoplastic members, and radiation curing the bonded members to provide a thermoset composite assembly.

BACKGROUND OF THE INVENTION

In attempts at making a vehicle body from fiber reinforced structural composite assemblies, prior art workers have employed hollow sections for the same reason that separate metal stampings are welded together to create a hollow section in conventional vehicle construction; namely, to increase the stiffness of a given component since stiffness increases by the cube of the increase in section thickness.

Hollow section fiber reinforced thermoset composites have been formed by gluing two panels together or molding the entire component around a foam core, blow molded inserts, and inflatable air bags in order achieve a desired stiffness level.

Hollow section fiber reinforced, thermoset composite assemblies have been proposed for use in the manufacture of a so-called space frame automobile structure wherein a reinforced structural composite side assembly or cage and reinforced structural composite floor module are bonded together by suitable adhesive and mounted on an underlying steel frame. The automobile space frame comprises opposing hollow, molded body side assemblies bonded together by suitable adhesive. Other reinforced composite components, such as a roof module and dash module, can also be incorporated in the structure.

Each hollow body side assembly includes glass reinforced, molded vinyl ester panels separated by a space or cavity therebetween. Each body side assembly is formed by positioning multiple glass fabric reinforcement preforms in a suitable mold, introducing thermosetting vinyl ester resin into the mold to impregnate the preforms, and heat curing the resin to form the hollow glass reinforced thermoset panel assembly.

Although fiber reinforced structural composites have been formed into hollow sections suitable for use in the construction of a vehicle body, such composites and process for making them into hollow sections have not resulted in a cost competitive alternative to the stamped/welded steel panel construction heretofore employed in motor vehicle construction.

There is thus a need for an improved method of making hollow section fiber reinforced structural composite assemblies for use as structural components in motor vehicle body and other constructions at lower cost. There is also a need for an improved method of making such hollow section fiber reinforced structural composite assemblies using other materials, such as thermoplastic materials, that will facilitate composite molding and bonding to form a simple or complex structural assembly and yet treatable to impart desirable thermoset properties to the final bonded assembly.

It is an object of the present invention to satisfy these needs.

SUMMARY OF THE INVENTION

The present invention contemplates a method of making a hollow section fiber reinforced composite assembly useful as a structural component wherein a first rigid, fiber reinforced, EB (electron beam) curable-thermoplastic composite member is formed by liquid castable molding (LCM) a thermoplastic-forming material about a fiber reinforcement and a second rigid, fiber reinforced, EB curable-thermoplastic composite member is similarly formed. The first and second rigid, fiber reinforced, thermoplastic members are then fusion bonded together in a manner to form a hollow section. The hollow section is subjected to irradiation by high energy electrons effective to cure the bonded first and second fiber reinforced, EB curable-thermoplastic members to a thermoset condition useful in structural applications.

In one embodiment of the invention, each fiber reinforced, EB curable-thermoplastic member is formed by introducing a liquid polyisocyanate material and a catalyzed, liquid polyol material into a mold about a fiber reinforcement (e.g., glass fiber preform) therein and reacting the materials to form an EB curable-thermoplastic matrix about the fiber reinforcement. Preferably, the polyisocyanate material comprises an aromatic polyisocyanate while the polyol material comprises an unsaturated esterol and a suitable catalyst for the polyol-isocyanate reaction. The unsaturated esterol more preferably comprises a fumarate containing carbon-to-carbon double bonds and being self-cross linking when subjected to EB irradiation in accordance with the invention.

In another embodiment of the invention, the first and second fiber reinforced, EB curable-thermoplastic composite members are bonded by fusing peripheral portions thereof together.

In still another embodiment of the invention, the hollow section is subjected to irradiation to obtain the thermoset condition by exposing the hollow section to a high energy electron beam; e.g., by passing the hollow section through an electron beam of a suitable beam generating device.

DESCRIPTION OF THE DRAWINGS

The foregoing and other objects and features of the present invention will become apparent upon consideration of the following description taken in conjunction with the accompanying drawing wherein.

The FIG. 1 is flow diagram illustrating one embodiment of the method of the present invention.

DETAILED DESCRIPTION OF THE INVENTION

Figure 1:
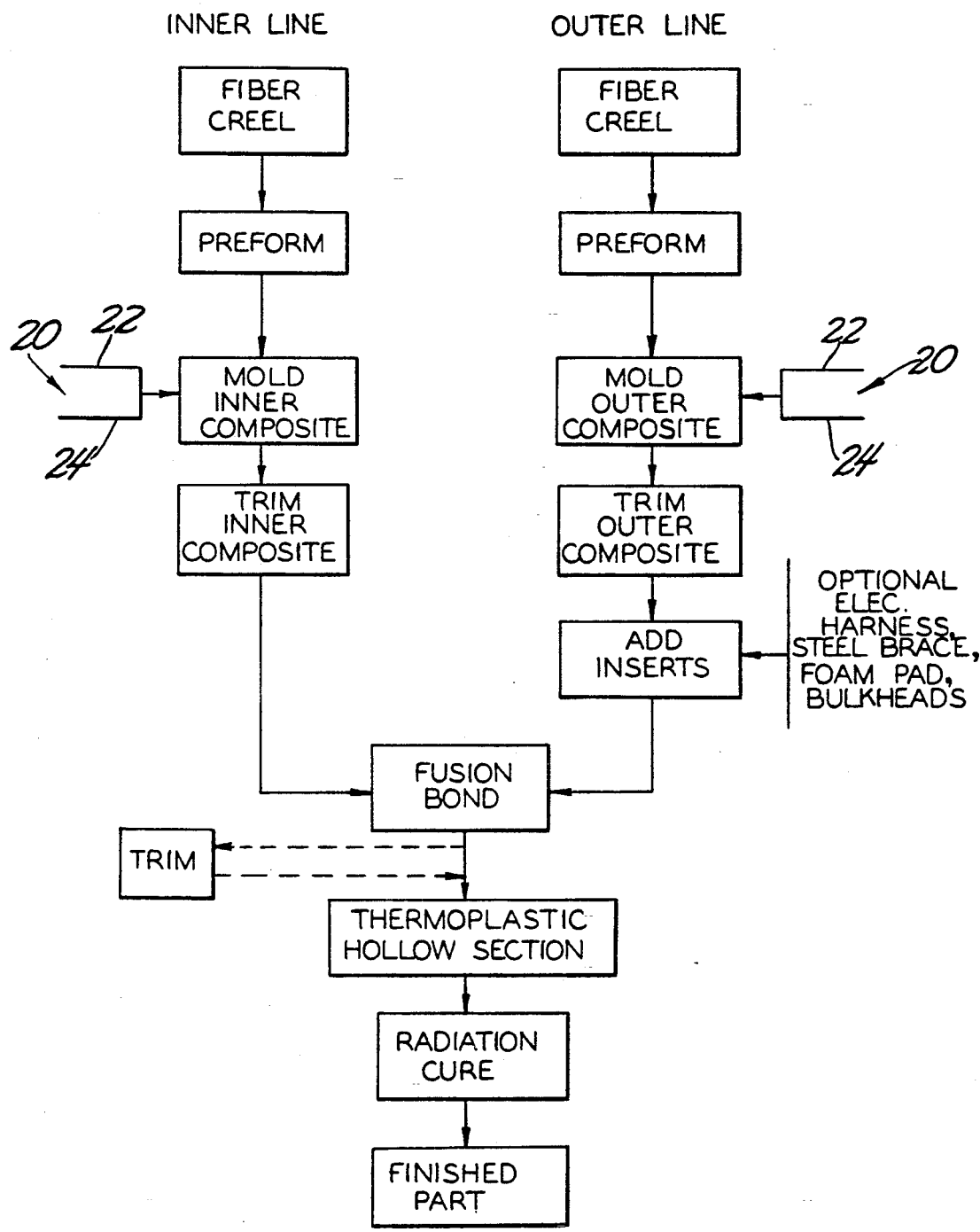
Figure 2:
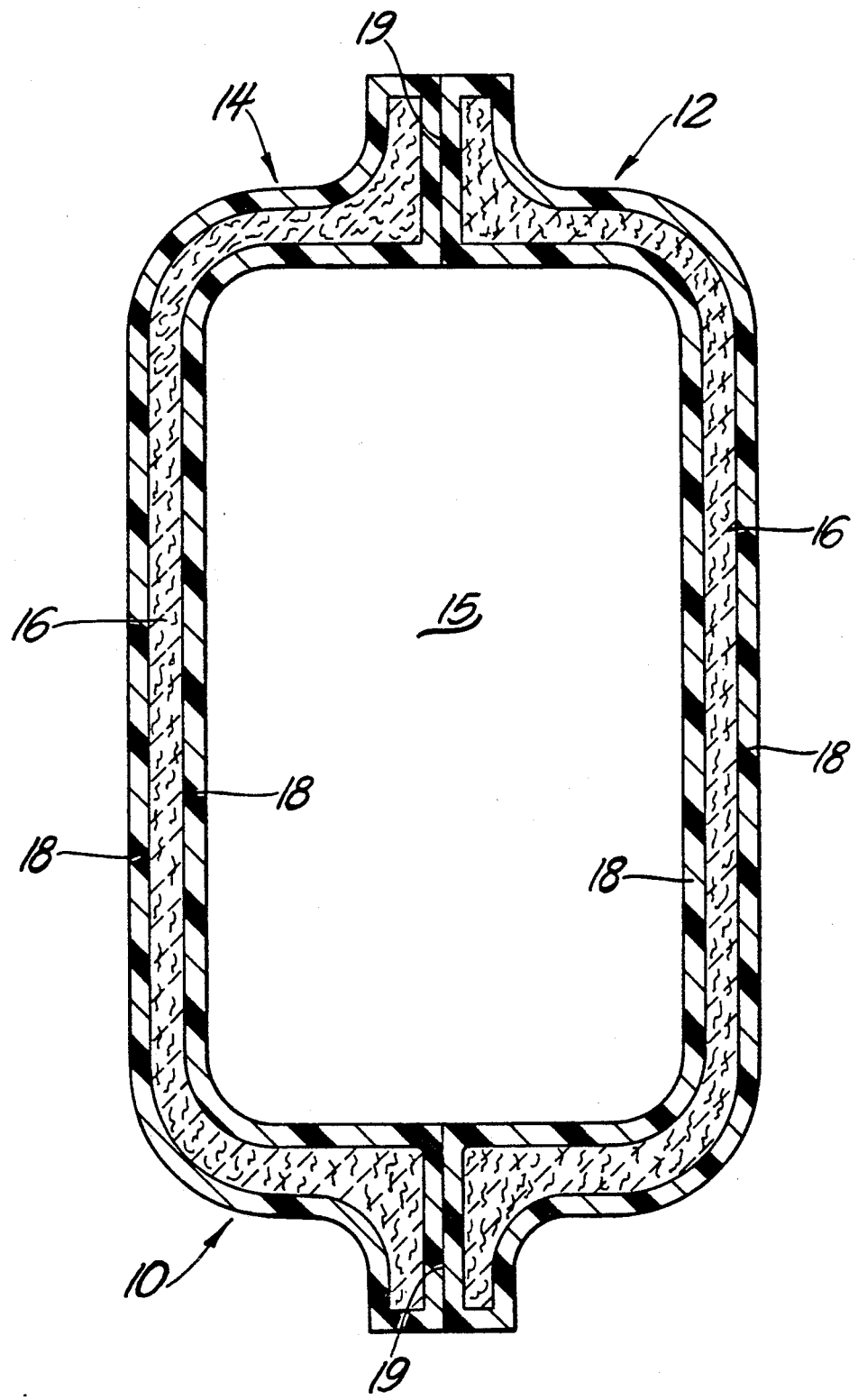
FIG. 2 is a sectional view, illustrating a hollow section fiber reinforced structural composite assembly made in accordance with the present invention.

Referring to FIG. 1, one exemplary embodiment of the invention for making a hollow section fiber reinforced composite assembly useful as a structural component in a motor vehicle is illustrated. An exemplary hollow section fiber reinforced composite assembly 10 made in accordance with the invention is shown in FIG. 2 as including first (outer) and second (inner) rigid, fiber reinforced, thermoset composite panels or members 12,14 joined together by a fusion bond 19 in a manner to be described. Each panel or member 12,14 comprises a fiber reinforcement 16, such as a shaped glass fiber preform, and thermoset matrix 18 that is initially molded about the reinforcement as a thermoplastic and then, after panel bonding, is EB cured to yield the thermoset condition. An internal cavity or hollow 15 is formed between the bonded members 12,14.

In accordance with the method of the invention illustrated in FIG. 1, the first (outer) composite member 10 and the second composite member 12 are formed by like processes wherein, in each process, a conventional glass fabric or other fiber reinforcement 16 on a fiber creel is cut and pressed to form a glass fabric preform in a selected configuration or shape needed for reinforcement purposes of the respective outer and inner composite assemblies. The glass fabric preform is typically formed to desired configuration by a chop and spray technique wherein the fibers are chopped and collected on a foraminous screen; for example, as described in PCT publication WO 91/04840, the teachings of which of are incorporated by reference. However, the invention is not limited to any particular technique for fabricating the preform to a desired configuration. For example, thermo-formable glass fiber mat can be pressed to shape. Moreover, the invention is not limited to any particular reinforcement material. For example, the fiber reinforcement may comprise metal, ceramic or other fiber formed to shape by suitable techniques.

Referring to FIG. 1, the fiber reinforcement preform for the outer composite assembly 10 is positioned in a mold (not shown) having a molding cavity formed (e.g., machined) to have the selected outer composite assembly envelope or configuration. The fiber reinforcement preform for the inner composite assembly 12 is likewise positioned in another mold having a molding cavity formed to the selected inner composite assembly envelope or configuration. Each mold comprises cooperating outer and inner mold halves which are opened to receive one or more fiber reinforcement preforms and are then closed after the fiber reinforcement preform(s) is/are positioned therein in accordance with known liquid castable molding (LCM) processing.

After each mold is closed, a liquid, thermoplastic-forming material 20 is introduced into each mold about and impregnating the respective fiber reinforcement preform therein. In particular, each thermoplastic-forming material 20 comprises a first liquid polyisocyanate resin reactive stream 22 and a liquid, catalyzed, polyol resin reactive stream 24 that are admixed and immediately pump-injected in LCM fashion into each mold through a suitable orifice therein communicating with the molding cavity so as to impregnate and encapsulate the respective fiber reinforcement preform in the molding cavity. The compositions of the streams 20,22 are selected to react substantially instantaneously in each mold tool in LCM fashion to couple the esterol with the polyisocyanate and thereby form an EB (electron beam) curable-thermoplastic material or matrix impregnating and encapsulating the fiber reinforcement preform therein.

The polyisocyanate resin stream 22 comprises an aromatic or aliphatic polyisocyanate, such as preferably polymeric toluene diisocyanate, of the type described in U.S. Pat. No. 4,374,229, the teachings of which are incorporated herein by reference. A preferred polyisocyanate for stream 22 is available as ARIMAX 1100-10 SIDE A from Ashland Chemical, Inc., P.O. Box 2219, Columbus, Ohio 43216, and is identified by that source as poly(methylene phenylene) polyisocyanate (diisocyanate).

The polyol stream 24 comprises an unsaturated esterol (unsaturated alcohol) and catalyst/amine promotor of the type described in aforementioned U.S. Pat. No. 4,374,229 for the polyol/isocyanate reaction. A preferred esterol for stream 24 is available as ARIMAX 1100 SIDE B from aforementioned Ashland Chemical, Inc. and is identified as an acrylic copolymer/ester in proportions, by weight, of 75-80%/20-25%. The esterol typically comprises a fumarate (e.g., see Example 1 of U.S. Pat. No. 4,514,229) having carbon-to-carbon double bonds and being self-cross linking by EB irradiation as described below. For example, the fumarate is formed by the catalytically induced addition reaction of a dicarboxylic acid anhydride (such as maleic anhydride or a mixture of maleic anhydride and phthalic anhydride) with a lower alkylene oxide in the presence of methacrylic acid or acrylic acid as the initiator followed by isomerization of the addition reaction products to the fumarate.

Importantly, in accordance with the present invention, the polyisocyanate reactive stream 22 is formulated to be devoid of free-radial, thermoset-promoting catalysts (e.g., the VAZO 64 and benzoyl peroxide catalysts for stream #1 of Example IV of U.S. Pat. No. 4,374,229) so that, in the practice of the method of the present invention, the streams 22,24 react to form the aforementioned thermoplastic matrix without thermosetting thereof by the reaction exotherm. In effect, a solely EB curable-thermoplastic, rigid matrix or material is formed and is not activated to thermoset unless bombarded with high energy electrons as will be described below. In this way, the first and second rigid, fiber reinforced, thermoplastic composite members are formed in the respective molds and, as a result of their thermoplasticity, are joinable together by localized, high speed thermoplastic fusion (welding) bonding techniques to be described hereinbelow, although the invention is not limited solely to fusion bonding techniques.

In order to adjust the mechanical properties (e.g., the rigidity) of the thermoplastic matrix formed by reaction of streams 22,24, the esterol may comprise a physical blend of two esterols wherein one esterol is made by reaction of propylene oxide, maleic anhydride and methoacrylic acid (e.g., per Example 1 of U.S. Pat. No. 4,374,229) and the other is made by a similar reaction of ethylene oxide, maleic anhydride and methacrylic acid. To this same end, the polyol stream 24 may include anhydrous silicates, such as CAB-O-SIL®TR720, as hydrophobic fillers.

Following removal from the respective molds, the first and second rigid, fiber reinforced, thermoplastic composite members are trimmed to remove flash and other unwanted material. Attachments and inserts (such as electrical wiring harnesses, steel braces, foam padding, and bulkheads in the context of motor vehicle composite members) may be fastened to one or both of the fiber reinforced, thermoplastic composite members after the trimming operation as indicated in FIG. 1 (for the outer fiber reinforced, thermoplastic composite member). Attachment and insertion of such components is facilitated at this point in the manufacturing process since both sides of each fiber reinforced, thermoplastic composite member are readily accessible.

Thereafter, the first and second rigid, fiber reinforced, thermoplastic composite members are fusion bonded together in a manner to form a hollow structural section. For example, the first and second composite members are fixtured with opposing peripheral regions (e.g., opposing molded flanges or shoulders) juxtaposed for fusion welding together while inboard regions of the composite members are in spaced relation to form the desired internal cavity between the bonded assembly. As mentioned above, as a result of their thermoplasticity, the first and second fiber reinforced, thermoplastic composite members preferably can be bonded by fusing (melting) selected opposing regions (e.g., the aforementioned molded flanges or shoulders) together using conventional localized, high speed thermoplastic welding techniques, such as ultrasonic, induction, resistance and other fusion welding techniques. Use of thermoplastic fusion welding techniques will greatly facilitate manufacture of hollow sections from the fiber reinforced, thermoplastic composite assemblies in a high volume production environment.

The opposing peripheral flanges or shoulders to be fusion welded may include tits or projections to induce a melted region therebetween during the bonding operation to provide optimum fusion bond strength.

Following bonding, the hollow sections may be sent to a trimming station for further trimming of excess or unwanted material therefrom or for trimming to final dimensional tolerances, as indicated in FIG. 1.

The hollow section is then subjected to a EB irradiation curing operation effective to cure the bonded first and second fiber reinforced, thermoplastic members to a thermoset condition useful in structural applications. In particular, the hollow section is exposed to high energy electron beam radiation to obtain the thermoset condition. EB curing of the bonded fiber reinforced, thermoplastic composite assemblies effects self crosslinking of the esterol chains through the carbon-to-carbon double bonds or linkages, thereby imparting a thermoset condition to the bonded composite assemblies.

Typically, the hollow section is carried on a conveyor or other moving device and passed at a suitable speed through an electron generating processor that generates high energy electrons, typically from a heated filament in a vacuum chamber for passage through a suitable window to the hollow section outside the window. The electron beam has sufficient intensity to effect curing to the thermoset condition. Since EB curing does not generate a high exotherm, no fixturing of the hollow section is required, although it may be used if desired.

Suitable electron generating processors for use in practicing the present invention are commercially available, such as from High Voltage Engineering Company, Burlington, Vermont, General Electric Co. Milwaukee, Wis., and Radiation Dynamics, Inc., Westbury, Long Island, N.Y. Electron generating processors are described in the Brenner and Oliver technical article entitled "Commercial Aspects Of Instantaneous Radiation Cure Of Reinforced Plastics", 22nd Annual Conference, The Society of the Plastics Industry-Reinforced Plastics Division. The size and electron beam intensity required to cure to the thermoset condition will depend on the size, especially the wall thickness, of the bonded hollow section and its speed through the electron beam as well as the type of EB curable-thermoplastic matrix formed and its curing properties.

While the invention has been described in terms of specific embodiments thereof, it is not intended to be limited thereto but rather only to the extent set forth hereafter in the following claims.

I claim:

1. A method of making a hollow section fiber reinforced composite assembly, comprising the steps of:
   a) forming a first rigid, fiber reinforced, EB curable-thermoplastic composite member,
   b) forming a second rigid, fiber reinforced, EB-curable thermoplastic composite member,
   c) fusion bonding the first and second fiber reinforced, thermoplastic members to form a hollow section, and
   d) subjecting the hollow section to irradiation by electrons effective to cure the bonded first and second fiber reinforced, EB-curable thermoplastic members to a thermoset condition.

2. The method of claim 1 wherein in step a) the first fiber reinforced, EB-curable thermoplastic member is formed by introducing a non-catalyzed, liquid polyisocyanate material and a catalyzed, liquid polyol material into a mold about a fiber reinforcement therein and reacting the materials to form an EB curable-thermoplastic matrix about the fiber reinforcement.

3. The method of claim 2 wherein the polyisocyanate material comprises a diisocyanate.

4. The method of claim 2 wherein the polyol material comprises an unsaturated esterol and a catalyst for the polyol/polyisocyanate reaction.

5. The method of claim 4 wherein the unsaturated esterol comprises a fumarate formed by the catalytically induced addition reaction of a dicarboxylic acid anhydride with alkylene oxide in the presence of methacrylic or acrylic acid followed by isomerization of the addition reaction product to the fumarate.

6. The method of claim 1 wherein in step b) the second fiber reinforced, EB-curable thermoplastic member is formed by introducing a non-catalyzed, liquid polyisocyanate material and a catalyzed, liquid polyol material into a mold about a fiber reinforcement therein and reacting the streams to form an EB curable-thermoplastic matrix about the fiber reinforcement.

7. The method of claim 4 wherein the polyisocyanate material comprises a diisocyanate.

8. The method of claim 4 wherein the polyol material comprises an unsaturated esterol and a catalyst for the polyol/polyisocyanate reaction.

9. The method of claim 8 wherein the unsaturated esterol comprises a fumarate formed by the catalytically induced addition reaction of a dicarboxylic acid anhydride with alkylene oxide in the presence of methacrylic or acrylic acid followed by isomerization of the addition reaction product to the fumarate.

10. The method of claim 1 wherein in step c), the first and second fiber reinforced, EB-curable thermoplastic composite members are bonded by fusing portions thereof together.

11. The method of claim 10 wherein peripheral portions of the composite members are fusion welded together.

12. The method of claim 1 wherein in step d), the hollow section is subjected to irradiation by an electron beam.

13. The method of claim 12 wherein the hollow section is passed through the electron beam.

14. A method of making a hollow section fiber reinforced structural composite assembly, comprising the steps of:
   a) forming a first rigid, fiber reinforced, EB curable-thermoplastic composite member by introducing a non-catalyzed, liquid polyisocyanate material and a catalyzed, liquid unsaturated esterol material into a mold about a fiber reinforcement therein and reacting the materials to form an EB curable-thermoplastic matrix about the fiber reinforcement, b) forming a second rigid, fiber reinforced, EB curable-thermoplastic composite member by introducing a non-catalyzed, liquid polyisocyanate material and a catalyzed, liquid unsaturated esterol material into a mold about a fiber reinforcement therein and reacting the materials to form an EB curable-thermoplastic matrix about the fiber reinforcement, c) fusion bonding the first and second fiber reinforced, thermoplastic members to form a hollow section, and d) irradiating the hollow section with electrons to cure the bonded first and second fiber reinforced, EB curable-thermoplastic members to a thermoset condition.

15. The method of claim 14 wherein the unsaturated esterol material comprises a fumarate formed by the catalytically induced reaction of a dicarboxylic acid anhydride with alkylene oxide in the presence of methacrylic or acrylic acid followed by isomerization of the addition reaction product to the fumarate.

* * * * *